United States Patent Office 3,173,903
Patented Mar. 16, 1965

3,173,903
COPOLYMERS OF ETHYLENE AND PROPYLENE
Carl A. Lukach, Wilmington, Del., Setha G. Olson, Moorestown, N.J., and Harold M. Spurlin, Wilmington, Del., assignors to Hercules Powder Company, Wilmington, Del., a corporation of Delaware
No Drawing. Filed Aug. 25, 1960, Ser. No. 51,791
3 Claims. (Cl. 260—88.2)

This invention relates to novel homogeneous copolymers of ethylene and propylene.

It is well known that olefins can be polymerized at relatively low temperatures and pressures by means of the so-called Ziegler catalyst, i.e., a transition metal compound used in combination with a metal alkyl. It is also known that mixtures of olefins can be copolymerized by this process. However, in the preparation of said copolymers, the olefins, having different polymerization rates enter into the copolymerization reaction at different speeds with the result that the copolymer produced is not homogeneous. Such a copolymer varies not only as to its composition, but as to its molecular weight distribution. Hence, only a small fraction of the total polymer may be one that has useful properties, and more than likely, even that small fraction will not have optimum properties for certain applications. Such is the case when ethylene and propylene are copolymerized by the so-called Ziegler process or modifications thereof. Ethylene enters into the polymer much faster than does propylene, and it has previously been impossible to produce an ethylene-propylene copolymer of uniform composition. While it has previously been possible to produce a copolymer essentially free of homopolymers, the product was still heterogeneous, that is, it was a mixture of copolymers varying widely in their ethylene and propylene content. Obviously, such a product is not desirable.

In copending application Serial No. 796,261, and now abandoned, of which this application is a continuation-in-part, there is described a process of copolymerizing ethylene with propylene to produce a polymeric product that is essentially homogeneous as to its composition, i.e., the mole ratio of the monomers in isolatable fractions of the total polymer is nearly constant, and which has a relatively narrow molecular weight distribution. By carrying out the copolymerization reaction in accordance with the process of the copending application, it is possible to prepare a product containing from 0.5 to 99.5 mole percent propylene. Those copolymers containing from about 25 to about 60 mole percent propylene exhibit outstanding properties as elastomers. Those copolymers containing from about 7 to about 20 mole percent, and preferably from about 10 to about 15 mole percent, exhibit outstanding properties as plastomers, i.e., they possess properties intermediate those of true elastomers and true plastics, while those copolymers containing less than about 7 mole percent propylene are essentially true plastics.

The present invention relates to a solid copolymer of ethylene and propylene having a propylene content of from about 7 mole percent to about 20 mole percent wherein at least 90 percent of the total copolymer has a propylene content within 5 percentage units of the average composition.

The copolymers of this invention are prepared by copolymerizing ethylene and propylene in a homogeneous liquid phase reaction mixture by passing ethylene and propylene into an inert liquid organic solvent having dissolved therein the copolymerization catalyst, at such a rate that the ratio of ethylene to propylene dissolved in the reaction mixture is kept constant through the polymerization reaction, the inert organic liquid diluent being one that is a solvent for each of the olefin monomers, the catalyst used for the copolymerization, and the copolymer that is produced, wherein the catalyst used for the copolymerization reaction is that formed by mixing an organoaluminum halide with a vanadium compound having the formula $VOY_{3-n}X_n$ where Y is an alkoxide group or acetylacetonate group, X is halogen, and $n$ is 0–2 when Y is an alkoxide group and $n$ is 0 when Y is an acetylacetonate group. By carrying out the process in this manner, it has been discovered that substantially all of the copolymer so produced is homogeneous as to its composition and has a relatively narrow molecular weight distribution.

While the process can be carried out to produce copolymers of widely varying molecular weight, the invention is particularly concerned with copolymers that have a reduced specific viscosity of at least 0.5. By the term "reduced specific viscosity" (RSV) is meant the $\eta sp/c$ determined on a 0.1% solution of the copolymer in decahydronaphthalene at 135° C. The copolymers of this invention are further characterized by a maximum density of less than about 0.920 and a maximum percentage of crystallinity of less than about 73%.

One of the criteria in carrying out the copolymerization process and producing a homogeneous product of uniform composition is the catalyst that is used for the copolymerization reaction. It has been found that the catalyst formed by reacting an organoaluminum halide with an ester of orthovanadic or haloorthovanadic acid or a vanadium oxyacetylacetonate is unique in that the copolymer produced using this catalyst in the manner described is essentially homogeneous as to its composition. As already stated, the effective catalyst is formed by mixing the aluminum compound and the vanadium compound. This mixing can be done prior to introduction of the catalyst in the polymerization system or the catalyst can be produced in situ by the addition of one or both of the catalyst ingredients. Any organoaluminum halide, i.e., diorganoaluminum halide, organoaluminum dihalide or mixtures of the two, such as ethylaluminum sesquichloride, can be used as the aluminum compound in this catalyst system. Thus, the organic portion can be any hydrocarbon group such as alkyl, cycloalkyl, aryl or alkaryl group, as for example, methyl, ethyl, propyl, isopropyl, n-butyl, isobutyl, t-butyl, amyl, isoamyl, hexyl, isohexyl, octyl, 2-ethylhexyl, cyclohexyl, phenyl, benzyl, etc., and the halogen can be chlorine, bromine or iodine.

The vanadium compound can be any compound having the formula $VOY_{3-n}X_n$ where Y is an alkoxide group or acetylacetonate group, X is halogen, and $n$ is 0–2 when Y is an alkoxide group and $n$ is 0 when Y is an acetylacetonate group. Thus, the vanadium compound can be a trialkyl ester of orthovanadic acid, a dialkyl ester of halo-othovanadic acid, or an alkyl ester of dihalo-orthovanadic acid, which esters have the general formula $VO(OR)_{3-n}X_n$ where R is alkyl, X is halogen and $n$ is 0–2, or the vanadium compound can be a vanadium oxytriacetylacetonate, which compounds have the general formula $VOA_3$ where A is the acetylacetonate radical, or a haloacetylacetonate radical. Exemplary of such vanadium compounds are triethyl-orthovanadate, tri-n-propyl orthovanadate, tri-n-butyl orthovanadate, tri-tert-butyl orthovanadate, diethylchloro-orthovanadate, monoethyldichloro-orthovanadate, vanadium oxytriacetylacetonate, vanadium oxy tri(trifluoroacetylacetonate), vanadium oxy tri(hexafluoroacetylacetonate), etc. The presence of other metal contaminants, and particularly compounds of titanium, are to be avoided because of their inherent tendency to give a high rate of polymerization of ethylene rather than copolymerization of ethylene with the propylene.

As already pointed out, the catalyst for the copolymerization reaction can be prepared prior to introduction into the reaction mixture by mixing solutions of the two catalyst ingredients, either in the diluent that is used for the reaction or in a diluent that is miscible with the reaction diluent. Preferably the premixed catalyst is used within a relatively short time, this time interval depending upon the temperature, the diluent used in preparing the premixed catalyst, and on the vanadium compound used as one of the components in the catalyst. When these premixed catalysts are used, the catalyst composition is added in increments or continuously throughout the copolymerization reaction. If a homogeneous copolymer is desired, continuous addition of either the premixed catalyst or continuous addition of both catalyst ingredients is preferred. Incremental addition of the catalyst or incremental formation of the catalyst in situ can approximate continuous addition if the interval between increments is relatively short. Regardless of the method by which the catalyst is formed, that is, premixed or formed in situ by one means or another, the amount of catalyst added or formed at any one time must be such that it will remain in solution in the polymerization mixture. In general, the amount of catalyst added is such as will maintain a reasonable rate of copolymerization under the reaction conditions. It has been found that in the catalyst system used, the rate of loss of catalytic activity is very high if the catalyst concentration is high in the presence of the monomers. Accordingly, a great advantage in the yield of copolymer per unit of catalyst consumed is derived if the catalyst is always added in such a fashion as to maintain a stationary but low concentration. In general, the rate of addition of the catalyst will preferably be at or below about 3 millimoles of vanadium per liter per hour. The ratio of aluminum compound to vanadium compound can be varied considerably but generally will be such that there is at least one aluminum for every oxygen in the vanadium compound.

The copolymers of this invention are prepared in an inert liquid organic diluent which is a solvent for the polymerization system. As pointed out above, to obtain a copolymer product of homogeneous composition throughout, the diluent should be one that is a solvent not only for the monomers being copolymerized, but also for the copolymer that is produced. In addition, it should also be a solvent for the catalyst so that the entire copolymerization reaction mixture is homogeneous throughout the copolymerization process. Suitable diluents for the copolymerization are, in general, the hydrocarbon solvents, i.e., aromatic, alicyclic and aliphatic hydrocarbons, chlorinated aromatic, alicyclic and aliphatic hydrocarbons and mixtures thereof. Exemplary of such diluents that can be used are hexane, heptane, octane, nonane, decane, benzene, toluene, xylene, cyclohexane, methyl cyclohexane, carbon tetrachloride, tetrachloroethylene, chlorobenzene, dichlorobenzene, etc.

In general, the temperature at which the copolymerization is conducted depends on the ratio of propylene to ethylene. Copolymers containing more than about 30 mole percent propylene can be prepared at lower temperatures, i.e., 0° C. to 35° C., but to prepare copolymers containing less than about 30 mole percent of propylene, as in this invention, it is necessary to use increasingly higher temperatures as the mole percentage of propylene decreases. For instance, it is preferred to carry out the copolymerization at about 60–70° C. when the desired copolymer contains 20 mole percent of propylene and at about 75–85° C. when the desired copolymer contains 10 mole percent of propylene. The reaction can be carried out at anywhere from 1 to 100 atmospheres of pressure.

Ethylene is copolymerized with propylene by saturating the liquid reaction mixture with a given concentration of propylene and maintaining the saturation at this level throughout the reaction. During the reaction, the ratio of propylene to ethylene in the gas phase is very different from that in the liquid phase since propylene is more soluble than ethylene, and ethylene is more reactive than propylene, so that the two monomers do not enter the copolymer in the ratio of their concentration in the solution. The composition of the copolymer being formed at any one moment is given by the equation:

$$\frac{m_2}{m_3} = \frac{M_2}{M_3}\left(\frac{r_2 M_2 + M_3}{r_3 M_3 + M_2}\right)$$

where $M_2$ and $M_3$ are mole fractions of ethylene and propylene, respectively, in the gas phase in equilibrium with the solution, $m_2$ and $m_3$ are mole fractions of ethylene and propylene in the copolymer being formed, and $r_2$ and $r_3$ are the reactivity ratios for ethylene and propylene, respectively, based upon monomer concentrations in the gas phase. In making the copolymers of the invention by the procedure described herein, $r_2$ and $r_3$ are approximately 5 and 1/5, respectively. Using these $r_2$ and $r_3$ values and inserting the mole fraction of ethylene and propylene desired in the copolymer, it is then possible to calculate what monomer ratio should be maintained in the gas phase in equilibrium with the solution and so produce the desired copolymer. These ratios can be maintained by monitoring the composition of the off-gas from the reaction and adjusting the ratios of the ethylene and propylene in the inlet streams.

The following examples are presented for the purpose of illustration, parts and percentages being by weight unless otherwise specified.

EXAMPLES 1–7

In these examples a series of ethylene-propylene copolymerizations was conducted in a 1-liter flow reactor with the catalyst formed in situ. The apparatus was alternately evacuated and flushed with nitrogen three times, 500 ml. of the diluent, chlorobenzene, was added under nitrogen, and the apparatus was again alternately evacuated and flushed with nitrogen three more times. The temperature of the reactor was adjusted to the desired level. Streams of ethylene and propylene were metered through a calibrated rotameter, mixed, and introduced into the reactor below the liquid level. The diluent was saturated at a rate of 1 liter per minute with a mixture of the ethylene and propylene in the proper ratio to yield a copolymer of the desired composition. The ratio was calculated as described above. An additional rotameter was used to record the volume of the off-gas. When the inlet and off-gas rotameter readings were identical, indicating that saturation was complete, the volume of the input mixture was reduced to 250 ml./min., and the off-gas was passed through a thermal conductivity cell so that its composition could be monitored and kept constant throughout the copolymerization run. The two catalyst ingredients, diethylaluminum chloride and triethyl orthovanadate, were added as 0.1 M and 0.02 M solutions in n-heptane, respectively. These solutions were pumped into the reactors separately and continuously with individual microbellows pumps. As soon as the copolymerization reaction started, there was an immediate drop in the value of the off-gas reading. At this point a second additional input stream (containing ethylene and propylene in the desired ratio for the copolymer being produced) was added at whatever rate was necessary to keep the total off-gas volume at 250 ml./min. Therefore, the rate of addition of the second stream corresponded to the rate of reaction, and the off-gas composition remained constant. In each example the reaction mixture was homogeneous throughout the run.

In Examples 1, 3 and 5, the reaction mixtures were quenched by adding 10 ml. of n-butanol and then were diluted with 100–200 ml. of heptane at the same temperatures as were used for the copolymerization and then washed with 200 ml. of 3% aqueous hydrochloric acid at 70° C. The organic layer was then separated and successively washed with hot water until the aqueous phase was neutral. The copolymers were isolated by removing the solvent by evaporation.

In Examples 2, 4, 6 and 7, the reaction mixture was cooled and then washed repeatedly with methanol. The white fibrous product was dried under vacuum at 40° C. overnight in each example.

In Table I is set forth the off-gas composition maintained during the polymerization in each example, the temperature at which the polymerization was run, the amounts of diethylaluminum chloride and triethyl orthovanadate added in each example, along with the yield of copolymer, its RSV and composition expressed as mole percent of propylene as determined by infrared analysis.

The fractionation was carried out in the following manner: about 1.2 g. of copolymer was dissolved in hot xylene, poured over the top of a 20 cm. sand column and allowed to precipitate by cooling. The column was next washed with ethylene glycol monoethyl ether to remove the xylene. The column was reheated to 125° C., and then the copolymer was fractionated with a mixed xylene-ethylene glycol monoethyl ether solvent which was gradually enriched in xylene. About 0.2% of phenyl-

*Table I*

| Example No. | Off-gas, Mole Percent $C_3H_6$ | Temp., °C. | $Al(C_2H_5)_2Cl$, mMole/liter | $VO(OC_2H_5)_3$, mMole/liter | | Al/V Ratio (final) | Reaction Time, min. | Copolymer Product | | |
|---|---|---|---|---|---|---|---|---|---|---|
| | | | | Added by pump | mMoles/ liter/min. | | | g./l./hr. | RSV | Mole Percent $C_3H_6$ |
| 1 | 23 | 82 | 2.4 | 0.48 | 0.021 | 5.0 | 23 | 62.0 | 3.9 | 7 |
| 2 | 31 | 79 | 3.5 | 0.69 | 0.028 | 5.0 | 25 | 51.4 | 5.2 | 12 |
| 3 | 36 | 76 | 5.12 | 0.97 | 0.028 | 5.3 | 35 | 59.0 | 3.3 | 12.5 |
| 4 | 42 | 80 | 3.4 | 0.69 | 0.023 | 5.0 | 30 | 44.7 | 4.9 | 13.5 |
| 5 | 47 | 75 | 5.6 | 1.1 | 0.028 | 5.0 | 40 | 37.0 | 4.3 | 17.5 |
| 6 | 50 | 75 | 3.18 | 0.64 | 0.022 | 5.0 | 29 | 44.0 | 4.6 | 19 |
| 7 | 55 | 76 | 4.56 | 0.91 | 0.022 | 5.0 | 42 | 41.7 | 4.9 | 20 |

Samples of the copolymers from Examples 1, 3 and 5 (which are representative of the range of copolymers prepared) were tested to determine their density and maximum percent crystallinity. Density was determined in a density gradient column, and maximum percent crystallinity was based on infrared values. These determinations are tabulated below:

| Copolymer | Mole Percent $C_3H_6$ | RSV | Density | Maximum Percent Crystallinity |
|---|---|---|---|---|
| Example 1 | 7.0 | 3.9 | 0.920 | 72 |
| Example 3 | 12.5 | 3.3 | 0.918 | 52 |
| Example 5 | 17.5 | 4.3 | 0.914 | 37 |

Samples of the copolymers from Examples 2–7 were cross-linked and their physical properties determined before and after cross-linking. (The physical properties of the copolymers from Examples 2, 3 and 5 were only determined after cross-linking.) Cross-linking was effected by combining 100 parts of copolymer, 50 parts of high abrasion furnace black, 4 parts of bis($\alpha,\alpha$-dimethylbenzyl) peroxide and 1 part of sulfur. Each formulation was then cured for 40 minutes at 154° C. (310° F.). The physical properties of these vulcanizates and uncured copolymers are set forth in Table II.

beta-naphthylamine was added to the solvent as an antioxidant. The solvent was allowed to flow at such a rate that about 100 ml. of solution were collected in 25 minutes. As the solution came out of the column, it dripped into a beaker containing 15 ml. of methanol and a small piece of Dry Ice. After a fraction (100 ml.) was collected, it was digested on a steam bath to coagulate the copolymer into a more easily filterable state. The copolymer was filtered, washed with methanol, dried under vacuum and its propylene content determined by infrared analysis. This analysis showed that the greatest variation in propylene content in any fraction was 2.6 percentage units from the average composition and, further, that the overall variations of all of the fractions was only 3.3%.

It can be seen from the above that the copolymer is essentially homogeneous as to its composition. Similar fractionations of the copolymers of Examples 2–7 show the same homogeneity, the propylene content of each fraction being within 5 percentage units of the average propylene content.

EXAMPLE 9

In this example ethylene and propylene were copolymerized by the procedure described in Examples 1–7 at 3 atmospheres pressure in a 2-liter reactor using one liter

*Table II\**

| Example No. | Mole Percent $C_3H_6$ | RSV | Tensile Strength, p.s.i. | Modulus, p.s.i. | | | | Maximum Elongation, Percent | Shore Hardness $A_2$ | Bashore Resilience, Percent | Break Set, Percent (10 min.) |
|---|---|---|---|---|---|---|---|---|---|---|---|
| | | | | 100% | 200% | 300% | 400% | | | | |
| 2 | 12 | 5.2 | 2,430 | 1,570 | 2,010 | | | 280 | 94 | 31 | 140 |
| 3 | 12.5 | 3.3 | 1,390 | 1,001 | 1,272 | | | 220 | 84 | 22 | 160 |
| 4 | 13.5 | 4.9 | 4,740 (3,000) | 920 (670) | 1,610 (695) | 2,460 (695) | 3,700 (815) | 480 (700) | 92 (84) | 32 (27) | 220 (450) |
| 5 | 17.5 | 4.3 | 4,300 | 892 | 1,890 | 3,345 | | 390 | 91.5 | 26 | 150 |
| 6 | 19 | 4.6 | 1,940 (1,935) | 860 (360) | 1,400 (360) | 1,940 (374) | (426) | 300 (900) | 83 (70.5) | 32 (30) | 80 (400) |
| 7 | 20 | 4.9 | 3,300 (1,850) | 640 (320) | 1,180 (320) | 2,060 (334) | 2,092 (386) | 420 (850) | 83 (64) | 32 (29) | 100 (350) |

*The figures in parentheses are values of uncured copolymer.

The above examples show that the copolymers of this invention give a vulcanizate with high tensile strength and excellent snap and recovery after stretching.

EXAMPLE 8

The copolymer of Example 1 (RSV=3.9, mole percent proplyene=7) was fractionated and the composition of each fraction, expressed as mole percent of propylene, was determined.

of benzene as a solvent to form a copolymer homogeneous as to composition. In the copolymerization the catalyst was formed in situ by adding solutions of diethylaluminum chloride and tri-tert-butyl orthovanadate. The product was worked up by diluting the reaction mixture with an equal volume of heptane, washing with 10% aqueous hydrochloric acid and then washing with distilled water. After washing, the solvent was removed by evaporation. The data for the copolymer are tabulated below along with its description.

Off-gas, mole percent $C_3H_6$ ---------------- 47
Temp., °C. ------------------------------------ 70
$VO(OC_4H_9)_3$, mMole/liter/min. ------------- 0.0031
Al/V ratio (final) ---------------------------- 6.0
Reaction time, min. --------------------------- 190
Copolymer product:
    Total gms. -------------------------------- 31.3
    RSV --------------------------------------- 5.7
    Mole percent $C_3H_6$ --------------------- 16

A sample of the copolymer was cross-linked by the procedure described in Examples 2–7. Physical properties of the vulcanizate are tabulated below:

Tensile strength, p.s.i. ---------------------- 1,435
Modulus, p.s.i.:
    100% -------------------------------------- 1,060
    200% -------------------------------------- 1,290
Maximum elongation, percent ------------------- 220
Shore hardness, $A_2$ ------------------------- 86
Bashore resilience, percent ------------------- 23
Break set, percent (10 min.) ------------------ 125

EXAMPLES 10–12

In these examples an aliquot of the reaction mixture of the copolymerization was taken near the halfway point of each run and the copolymer isolated was compared with the final copolymer product as to RSV and mole percentage propylene. The copolymerizations were carried out by the procedure described in Examples 1–7 at 30 p.s.i.g. and 75° C. in a 30-gallon reactor using 71 liters of chlorobenzene as the solvent. The catalyst was formed in situ by adding solutions of diethylaluminum chloride and tri-tert-butyl orthovanadate. In each example, the reaction mixture was homogeneous.

The products were worked up by washing twice with hot water and then evaporating the diluent. The data for each copolymerization are tabulated in Table III along with the description of the copolymer product.

a floor tile and its properties determined. The formula of the tile was as follows:

21 parts of ethylene-propylene copolymer
47 parts of finely crushed limestone
26 parts of asbestos
3 parts of a rosin-derived alkyd-type resin
3.3 parts of $TiO_2$ After the copolymer was softened by milling on a two-roll mill at about 120° C. to 125° C., the other ingredients (premixed) were added and mixed. The tile was sheeted off the mill in one-eighth inch thickness and allowed to harden on a flat surface. The tile was superior to commercial vinyl tile in flexibility and toughness. Tile prepared from the copolymer could be folded without cracking while vinyl tile could not be folded without cracking.

In the properties of chemical resistance (to acids, bases, and detergents) and strength, the tile prepared from the copolymer was found to be equal to commercial vinyl tile.

EXAMPLES 14–30

A series of ethylene-propylene copolymerizations was carried out by the procedure described in Examples 1–7 in a 100-gallon reactor. Chlorobenzene was used as the solvent in each example except Example 25 where a mixed aliphatic and alicyclic solvent having a boiling range of 94–99° C. and a specific gravity of 0.731 was used. The pressure was 30 p.s.i.g. in each example except Example 25 where a pressure of 40 p.s.i.g. was used. The catalyst was formed in situ by adding solutions of diethylaluminum chloride and tri-tert-butyl orthovanadate in each example except Example 25 where the diethylaluminum chloride was replaced with ethylaluminum sesquichloride. The reaction mixtures were entirely homogeneous. In each example the product was washed at 80° C. with an aqueous solution of sodium hydroxide containing small amounts of gluconic acid and 4,4'-thio-bis(6-tert-butyl-m-cresol). The copolymer

*Table III*

| Example No. | Off-gas, Mole Percent $C_3H_6$ | $Al(C_2H_5)_2Cl$, mMole/liter | $VO(OC_4H_9)_3$, mMole/liter/min. | Al/V Ratio (final) | Reaction Time, min. | Copolymer Product | | |
|---|---|---|---|---|---|---|---|---|
| | | | | | | Total gms. | RSV* | Mole* percent $C_3H_6$ |
| 10 | 33–37 | 4.38 | 0.0035 | 10.0 | 125 | 5,650 | 2.2 (2.9) | 10 (9.5) |
| 11 | 23–25 | 4.21 | 0.0035 | 10.0 | 120 | 7,010 | 2.4 (2.5) | 9 (8.5) |
| 12 | 40–41 | 3.03 | 0.0036 | 7.0 | 120 | 5,500 | 4.8 (5.1) | 15 (16.5) |

*The figures in parentheses are values of copolymers recovered from aliquots taken after about 60 min. reaction time and serve to show that the composition of the copolymer remains essentially constant during the run.

EXAMPLE 13

The copolymer of Example 12 (RSV=4.8–15 mole percent propylene) was employed in the preparation of was then isolated by evaporating the solvent at 160° C. The data for each copolymerization are tabulated in Table IV along with the description of the copolymer produced.

*Table IV*

| Example No. | Off-gas, Mole percent $C_3H_6$ | Temp., °C. | Solvent (gal.) | $Al(C_2H_5)_2Cl$, mMole/liter | $VO(OC_4H_9)_3$, mMole/liter/hr. | Al/V Ratio (final) | Reaction Time, hrs. | Copolymer Product | | |
|---|---|---|---|---|---|---|---|---|---|---|
| | | | | | | | | Total lbs. | RSV | Mole percent $C_3H_6$ |
| 14 | 28 | 75–82 | 50 | 4.00 | 0.04 | 25 | 3.0 | 5.8 | 1.8 | 7.0 |
| 15 | 34 | 79–80 | 50 | 2.56 | 0.04 | 16 | 4.0 | 6.0 | 2.3 | 8.0 |
| 16 | 31 | 78–82 | 50 | 2.00 | 0.04 | 20 | 2.5 | 6.8 | 2.9 | 8.0 |
| 17 | 33 | 79–81 | 50 | 1.32 | 0.04 | 11 | 3.0 | 6.7 | 3.3 | 9.0 |
| 18 | 41 | 78–83 | 100 | 8.64 | 0.04 | 27 | 8.0 | 18.4 | 1.4 | 10.0 |
| 19 | 42 | 75–80 | 50 | 4.00 | 0.04 | 25 | 4.0 | 5.2 | 2.2 | 10.0 |
| 20 | 42 | 75–82 | 50 | 5.92 | 0.06 | 22 | 4.5 | 7.7 | 1.8 | 11.0 |
| 21 | 44 | 72–81 | 50 | 2.56 | 0.04 | 16 | 4.0 | 6.9 | 2.3 | 11.5 |
| 22 | 42 | 73–81 | 50 | 1.82 | 0.04 | 13 | 3.5 | 4.6 | 7.0 | 11.5 |
| 23 | 41 | 74–80 | 50 | 3.20 | 0.04 | 20 | 4.0 | 5.0 | 5.0 | 11.5 |
| 24 | 48 | 83 | 50 | 4.32 | 0.04 | 27 | 4.0 | 5.0 | 2.4 | 13.0 |
| 25 | 42 | 67–73 | 95 | 25.4 | 0.151 | 28 | 6.0 | 21.0 | 2.9 | 14.0 |
| 26 | 44 | 75–82 | 50 | 1.32 | 0.04 | 11 | 3.0 | 4.2 | 3.5 | 14.0 |
| 27 | 42 | 73–80 | 50 | 1.82 | 0.04 | 13 | 3.5 | 6.7 | 6.8 | 14.5 |
| 28 | 49 | 77–84 | 50 | 1.60 | 0.04 | 10 | 4.0 | 4.9 | 3.8 | 14.5 |
| 29 | 48 | 78–81 | 50 | 2.38 | 0.04 | 20 | 3.0 | 1.6 | 2.8 | 15.0 |
| 30 | 43 | 62–86 | 100 | 6.45 | 0.04 | 18 | 6.0 | 27.0 | 4.0 | 20. |

Samples of the copolymers from Examples 15, 19, 20, 24, 28 and 30 (which are representative of the range of copolymers prepared) were tested to determine their density and maximum percent crystallinity. The determinations were made as described in Examples 1–7 and are tabulated below:

| Copolymer | Mole percent $C_3H_6$ | RSV | Density | Maximum percent Crystallinity |
|---|---|---|---|---|
| Example 15 | 8.0 | 2.3 | 0.916 | 53 |
| Example 19 | 10.0 | 2.3 | 0.907 | 49 |
| Example 20 | 11.0 | 1.8 | 0.910 | 45 |
| Example 24 | 13.0 | 2.4 | 0.897 | 42 |
| Example 28 | 14.5 | 3.8 | 0.888 | 39 |
| Example 30 | 20.0 | 4.0 | 0.867 | 38 |

Samples of the copolymers from Examples 15, 17, 21 and 26 were cross-linked by combining 100 parts of copolymer, 80 parts of medium thermal black and 3 parts of bis(α,α-dimethylbenzyl)peroxide and then heating at 154° C. for 45 minutes. The properties of these vulcanizates are set forth in Table V.

The copolymers can be mixed with one or more additives such as fillers, pigments, stabilizers, extenders, etc., when these are desirable. The use of a filler is especially beneficial when the copolymers are to be cross-linked as previously described. Exemplary of the fillers that can be mixed with the copolymers of this invention are: calcium carbonate; iron oxide; carbon black such as channel black, channel conducting black, channel hard processing black, channel medium processing black, channel easy processing black, furnace conducting black, furnace fine black, furnace high modulus black, furnace high elongation black, furnace reinforcing black, furnace semi-reinforcing black, thermal fine black, thermal medium black, acetylene black, lamp black, etc., silica such as silica xerogel, silica aerogel, fumed silica, alkyl-surface-esterified silica as described in U.S. Patent 2,657,149, alkyl chlorosilane-treated silica as described in U.S. Patent 2,510,661, precipitated (hydrated) calcium silicate, etc.; and alumina such as hydrated aluminum oxide, activated (dehydrated) alumina, α-alumina, gamma-alumina, etc. The optimum ratio of filler to copolymer can readily be determined and will depend upon the properties desired.

*Table V*

| Example No. | Mole Percent $C_3H_6$ | Tensile Strength (p.s.i.) | Modulus, p.s.i. | | | | Maximum Elongation, Percent | Shore Hardness B | Bashore Resilience, Percent | Break Set Percent (10 min.) | Flexural Stiffness (p.s.i.) |
|---|---|---|---|---|---|---|---|---|---|---|---|
| | | | 10% | 100% | 200% | 300% | | | | | |
| 15 | 8.0 | 2,100 | 1,230 | 1,400 | 1,800 | ---------- | 280 | 80 | 29 | 190 | 39,000 |
| 17 | 9.0 | 2,450 | 1,050 | 1,430 | 2,020 | 2,430 | 300 | 80 | 26 | 180 | 25,800 |
| 21 | 11.5 | 1,920 | 910 | 1,070 | 1,400 | 1,870 | 330 | 76 | 33 | 200 | 22,000 |
| 26 | 14.0 | 2,270 | 730 | 1,120 | 1,760 | 2,230 | 320 | 71 | 38 | 150 | 16,000 |

The copolymers of this invention, although much less rubber-like in character than the copolymers containing 25 mole percent or more of propylene, nevertheless, combine the desirable features of low compounding temperatures and high extensibility with fillers without loss of flexibility and toughness. These properties are particularly sought for in wire coating, upholstery, low cost pipe, battery boxes, film and floor tile applications, etc.

In many of their uses, the copolymers of this invention perform best when they are cross-linked, i.e., vulcanized, according to known methods. Various free-radical producing agents can be used for this purpose, organic peroxides being especially suitable. Exemplary of the preferred class of peroxides are 2,5-bis(t-butylperoxy)-2,5-dimethylhexane, bis(α,α-dimethylbenzyl)peroxide, bis(α,α-dimethyl-p-methylbenzyl)peroxide, di-tert-butyl peroxide, bis(α,α-diisopropylnaphthylmethyl)peroxide, bis(α,α-dimethyl-p-isopropylbenzyl)peroxide, benzyl(α-methylbenzyl)peroxide, benzyl(α,α-dimethylbenzyl)peroxide, p-menthyl(α,α-dimethylbenzyl)peroxide, tert-butyl-1,1,2,2-tetramethyl propyl peroxide, etc. If desired, auxiliary cross-linking agents, such as sulfur, can be used in combination with the peroxide.

What we claim and desire to protect by Letters Patent is:

1. A solid copolymer of ethylene and propylene having a propylene content of from about 7 mole percent to about 20 mole percent, wherein at least 90% of the total copolymer has a propylene content within 5 percentage units of the average composition.

2. The copolymer of claim 1 wherein the propylene content is from about 10 mole percent to about 15 mole percent.

3. A plastomeric composition comprising a cross-linked copolymer of ethylene and propylene and a filler, said copolymer having a propylene content of from about 7 mole percent to about 20 mole percent, wherein at least 90% of the total copolymer has a propylene content within 5 percentage units of the average composition.

References Cited by the Examiner

FOREIGN PATENTS 553,655  6/57  Belgium.

JOSEPH L. SCHOFER, *Primary Examiner.*

L. H. GASTON, J. R. LIBERMAN,
WILLIAM H. SHORT, *Examiners.*